United States Patent
Althukair

(10) Patent No.: US 10,207,239 B2
(45) Date of Patent: Feb. 19, 2019

(54) FLUID DISTRIBUTION IN A FLUIDIZED BED REACTOR

(71) Applicant: SABIC Global Technologies B.V., Bergen op Zoom (NL)

(72) Inventor: Mohammed Althukair, Riyadh (SA)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 15/742,543

(22) PCT Filed: Jul. 4, 2016

(86) PCT No.: PCT/EP2016/065673
§ 371 (c)(1),
(2) Date: Jan. 8, 2018

(87) PCT Pub. No.: WO2017/005680
PCT Pub. Date: Jan. 12, 2017

(65) Prior Publication Data
US 2018/0200688 A1     Jul. 19, 2018

Related U.S. Application Data

(60) Provisional application No. 62/195,374, filed on Jul. 22, 2015.

(30) Foreign Application Priority Data

Jul. 6, 2015  (EP) ..................................... 15175376

(51) Int. Cl.
*B01J 8/18*      (2006.01)
*B01J 8/44*      (2006.01)

(52) U.S. Cl.
CPC ............... *B01J 8/44* (2013.01); *B01J 8/1818* (2013.01); *B01J 8/1827* (2013.01);
(Continued)

(58) Field of Classification Search
CPC ............................. B01J 8/1818; B01J 8/1827
(Continued)

(56) References Cited

U.S. PATENT DOCUMENTS 3,653,843  A      4/1972   Seelander
4,115,929  A *   9/1978   Staub ........................ B01J 8/44
                                                                    34/369
(Continued)

FOREIGN PATENT DOCUMENTS

CN        201043858 Y      4/2008
EP          0721798 A2     7/1996
WO      2005072256 A2      8/2005

OTHER PUBLICATIONS

Chinese Patent No. 201043858; Date of Publication: Apr. 4, 2008; Abstract Only, 1 page.
(Continued)

*Primary Examiner* — Huy Tram Nguyen
(74) *Attorney, Agent, or Firm* — Cantor Colburn LLP

(57) ABSTRACT

A fluid distribution cap (301) for a fluidized bed reactor, comprising a tunnel shaped structure having two opposing walls for attaching to a fluid distribution plate (103), and at least one opening at an end of the tunnel shaped structure. The tunnel shaped structure has an inner surface (302) and an outer surface (303), wherein the inner surface (302) has a curved cross section, and wherein the outer surface (303) has a substantially V-shaped cross section. A fluid distribution plate (103) for a fluidized bed reactor, comprising a plate having a plurality of fluid vent holes (113), a plurality of fluid distribution caps (301), wherein for each fluid vent hole (113) a fluid distribution cap (301) is mounted over said hole (113). At least two mutually neighboring fluid distribution caps (301) are positioned with an opening of a first of the two neighboring fluid distribution caps facing a side of the second of the two neighboring fluid distribution caps. A
(Continued)

fluidized bed reactor having a fluid distribution plate (103) and a fluid distribution cap (301).

9 Claims, 5 Drawing Sheets

(52) U.S. Cl.
CPC ............... *B01J 2208/00176* (2013.01); *B01J 2208/00274* (2013.01); *B01J 2208/00893* (2013.01)

(58) Field of Classification Search
USPC ........................................ 422/145
See application file for complete search history.

(56) References Cited

U.S. PATENT DOCUMENTS 4,257,171 A * 3/1981 Johnson ............... F26B 3/082
34/582
5,753,191 A * 5/1998 Yamamoto ............ B01J 8/24
422/143

OTHER PUBLICATIONS

International Search Report for International Application No. PCT/EP2016/065673, dated Oct. 11, 2016; 5 Pages.
Written Opinion of the International Search Report for International Application No. PCT/EP2016/065673, dated Oct. 11, 2016; 5 Pages.

* cited by examiner

FLUID DISTRIBUTION IN A FLUIDIZED BED REACTOR

CROSS REFERENCE TO RELATED APPLICATIONS

This applications is a 371 of International Application No. PCT/EP2016/065673, filed Jul. 4, 2016, which claims priority to European Application No. 15175376.1, filed Jul. 6, 2015 and U.S. Application No. 62/195,374 filed Jul. 22, 2015, all of which are incorporated herein by reference in their entirety.

FIELD OF THE INVENTION

The invention relates to a fluid distribution cap and a fluid distribution plate for a fluidized bed reactor and a fluidized bed reactor comprising the fluid distribution cap and the fluid distribution plate.

BACKGROUND

Fluidized bed reactors are used in polymerization processes involving reactants and/or catalysts in liquid, gas and solid phases. By blowing a fluid or gas reactant into solid particles from below the particles, a fluidized bed is created which floats on the upwards flowing fluid against gravity. When the fluid flow is ceased, the solid particles will come to a rest at the bottom of the fluidized reactor vessel. In order to avoid inlet pluggage or clogging of the reactor vessel, a fluid distribution plate is introduced which allows the fluid to disperse and pass through towards an upper part of the reactor vessel to create the fluidized bed, but which captures the solid particles with fluid distribution caps when the fluidized bed is settled with the reactor shut off and prevents them from contaminating and clogging the reactor inlet.

The fluid distribution plate has fluid vent holes to allow the fluid to pass through to the upper part of the reactor vessel and evenly distribute the fluid across the fluidized bed. The fluid vent holes are covered by a fluid distribution cap to contain the solid particles above the fluid distribution plate, which avoid reactor inlet pluggage which would require a shutdown to remove the clog.

The fluid vent holes and fluid distribution caps cause a pressure drop over the fluid distribution plate, which pressure drop is preferably as low as possible while maintaining even distribution across and above the plate. The reactor and thus the fluid distribution plate should be designed to permit operation for long periods of time without having to shut down for cleaning.

A problem that may occur in known fluidized bed reactors is the flow resistance and stagnant zones of the fluid vent holes in combination with the fluid distribution caps. The design of the fluid vent holes and fluid distribution caps should provide adequate movement of solids between the holes in the distribution plate to prevent sintering of resin in this area, however in stagnant zones underneath or in the vicinity of the distribution caps resins or solids that are entrained in the recycle fluid may be captured by the distribution cap openings which would accumulate and eventually plug the fluid vent holes, requiring undesired maintenance of the fluid bed reactor.

SUMMARY

It is therefore an object of the invention to provide improved fluidization dynamics above the fluid distribution plate whilst avoiding stagnant zones within the distribution caps and above the fluid distribution plate, preventing clogging and plugging of distributor plate vent holes or cap openings, and rendering a fluidized bed reactor mechanically and geometrically simple minimizing maintenance and construction costs.

The object is achieved in a fluid distribution cap for a fluidized bed reactor or a fluidized bed reactor used in a polymerization, comprising a tunnel shaped structure having two opposing walls for attaching to a fluid distribution plate, and at least one opening at an end of the tunnel shaped structure. The tunnel shaped structure has an inner surface and an outer surface, wherein the inner surface has a curved cross section, and wherein the outer surface has a substantially V-shaped cross section.

When mounted on a fluid distribution plate, more specifically over a fluid vent hole in the fluid distribution plate, the curved inner surface cross section incurs less cap resistance thus allowing improved flow of fluid distributed from the fluid distribution cap for a given pressure drop. The rounded curved inner surface causes an even distribution of the fluid flowing through the cap, which substantially reduces stagnant zones within the fluid distribution cap thereby preventing the fluid carrying fines from clogging.

The V-shaped cross section of the outer surface allows a fluid flow parallel to the fluid distribution plate to encounter a side of a neighboring fluid distribution cap to be deflected in a vertical direction, away from the fluid distribution plate towards the fluidized bed. Thus fluidization dynamics of the fluidized bed reactor are improved. With the fluid bed reactor at rest, the fluid distribution cap prevents particles of the settled bed to spill through the fluid vent hole.

In an embodiment, the inner surface has a substantially semicircular cross section. The inner surface can for example be manufactured from a pipe segment.

In an embodiment, the tunnel shaped structure has two openings at opposing ends of the structure. The tunnel shape allows openings at both ends or allow an opening to be closed forcing the fluid flow through the single opening, depending on specific requirements for the fluidized process in the reactor.

In an embodiment, the tunnel shaped structure is a one-piece object. This allows manufacture of the fluid distribution cap from solid material by for example injection molding or casting.

In another embodiment, the structure comprises an angle profile forming the V-shaped outer surface and a pipe segment forming the curved inner surface, the pipe segment attached to an inner part of the angle profile. This allows manufacture of the fluid distribution cap from readily available materials such as the angle profile and the pipe segment.

In an embodiment, the fluid distribution cap has a filler between the angle profile and the pipe segment for closing a clearance between the angle profile and the pipe segment. This prevents stagnant zones between the pipe segment and the angle profile, thus preventing clogging and plugging between these parts. Alternatively, the clearance between the angle profile and the pipe segment may be covered by a cover.

The object is further achieved in a fluid distribution plate for a fluidized bed reactor, comprising a plate having a plurality of fluid vent holes, a plurality of fluid distribution caps as described. For each fluid vent hole a fluid distribution cap is mounted over said hole. The fluid distribution cap is preferably positioned on the fluid distribution plate relative to the vent hole, having the vent hole at its center. The at least two mutually neighboring fluid distribution caps are positioned with an opening of a first of the two neighboring fluid distribution caps facing a side of the second of the two neighboring fluid distribution caps.

The positioning of the two mutually neighboring fluid distribution caps allows a fluid flow from the at least one opening of one fluid distribution cap towards a side of the neighboring fluid distribution cap. The V-shaped cross section of the outer surface causes vertical deflection of the fluid flow. Thus fluidization dynamics of the fluidized bed are improved.

The object is also achieved in a fluidized bed reactor or fluidized bed reactor used in a polymerization process having a fluid distribution plate as described. The upward flow towards the fluidized bed from the fluid distribution plate having the fluid distribution caps as described, improves fluidization dynamics of the fluidized bed reactor. Finally, the invention also concerns the use of a fluid distribution cap according to the invention or fluid distribution plate according to the invention in a polymerization process.

DETAILED DESCRIPTION OF EMBODIMENTS

Figure 1:
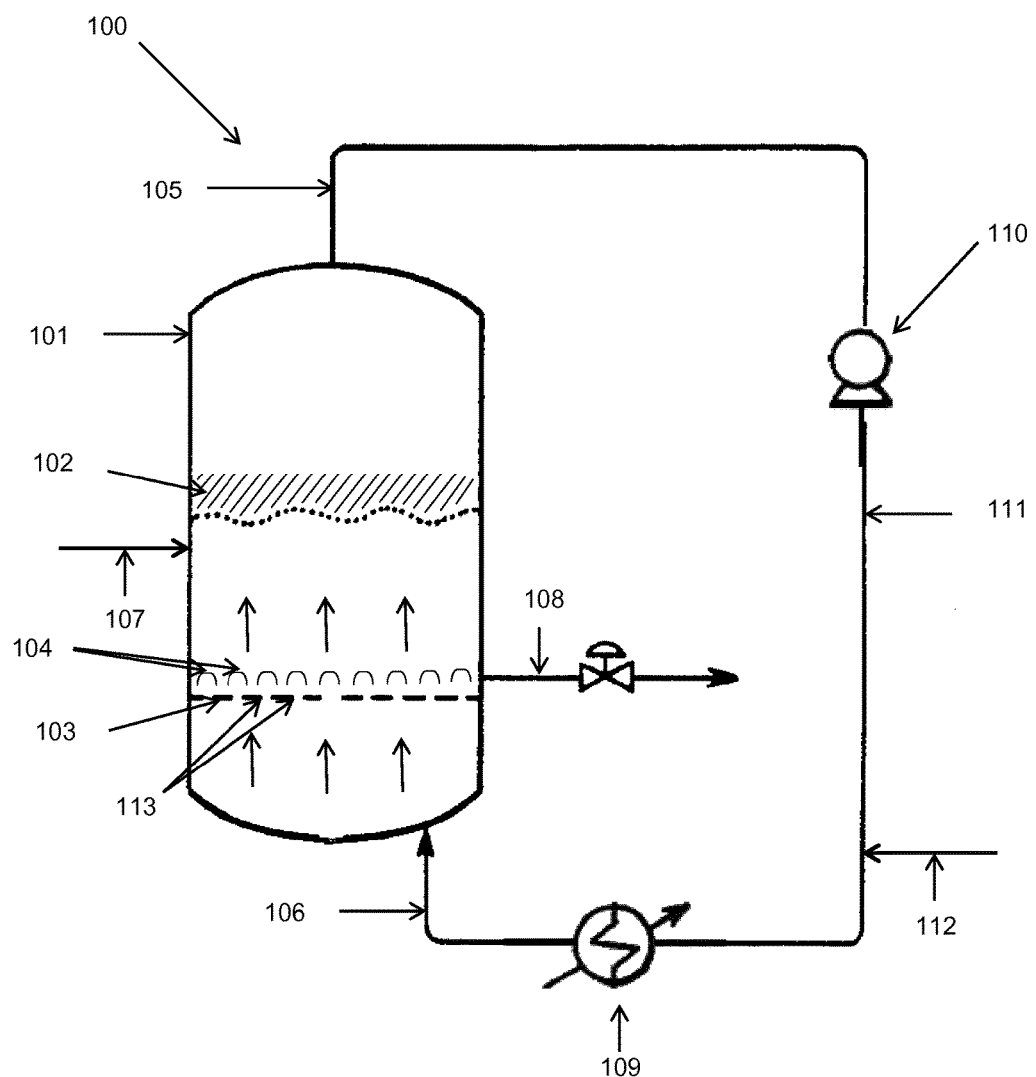
FIG. 1 shows a schematic diagram of an exemplary fluidized bed reactor according to the state of the art.

FIG. 1 shows a schematic diagram of an exemplary system 100 with a fluidized bed reactor 101 which can be used in a process for polymerization according to the state of the art. The fluid fluidized bed reactor 101 has a fluidized bed 102 wherein the process of polymerization is performed. The fluidized bed reactor 101 can have a product outlet 108 from where the polymer can be extracted from the system 100. Reactants and/or inerts for use in the fluidized bed reactor can be supplied via fluid supply 112 to the system 100. Via fluid inlet 106, the fluid enters the fluidized bed reactor 101. In an upward flow indicated by the upward pointing arrows through vent holes 113 in the fluidized bed reactor the fluid passes from a lower end of the fluidized bed reactor 101 to an upper part having the fluidized bed 102. Fluid distribution caps 104 prevent fluidized bed material from passing through the fluid distribution plate 103 when the fluidized bed reactor is in rest. Further reactants may be added to the fluidized bed reactor 101 via supplementary inlet 107. Fluid escaping from fluidized bed 102 is captured in fluid outlet 105, and via fluid return 111 returned to the fluid inlet 106 of the system 100. The fluid in the system is compressed and circulated through the system using a cycle gas compressor 110. In heat exchange 109 any surplus heat can be exchanged with the environment.

Figure 2A:
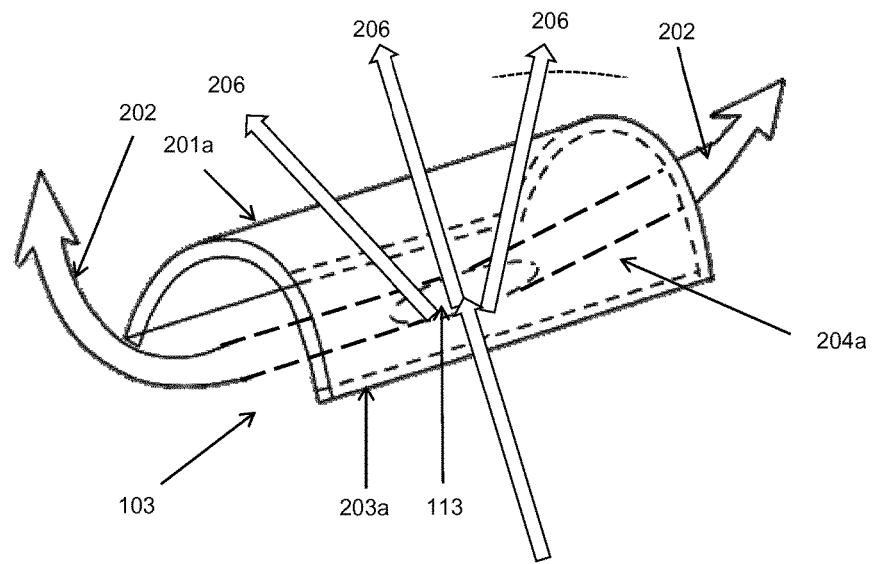
FIG. 2a shows a fluid distribution cap according to the state of the art.

FIG. 2a shows an example of a fluid distribution cap in the shape of a pipe segment 201a according to the state of the art. The fluid distribution cap 201a is attached to a fluid distribution plate 103 at the edges of the pipe segment sidewalls 204a. The pipe segment shaped fluid distribution cap 201a is placed over vent hole 113 allowing a fluid outflow 202 from underneath the pipe segment 201a.

Horizontal components 205 of the fluid outflow 202 from another fluid distribution cap 204a causes a scattered upward flow of the fluid, i.e. flow in various upward directions due to the curved outer surface of the distribution cap 201a. Due to the relative steep angle of the side walls 201a of the pipe segment shaped fluid distribution cap 201a, the outside edges 203a of the fluid distribution cap 201a may form a stagnant zone where fluid flow is low. In such a stagnant zone, the fluid may clog, thereby contaminating the fluid distribution plate 103.

Figure 2B:
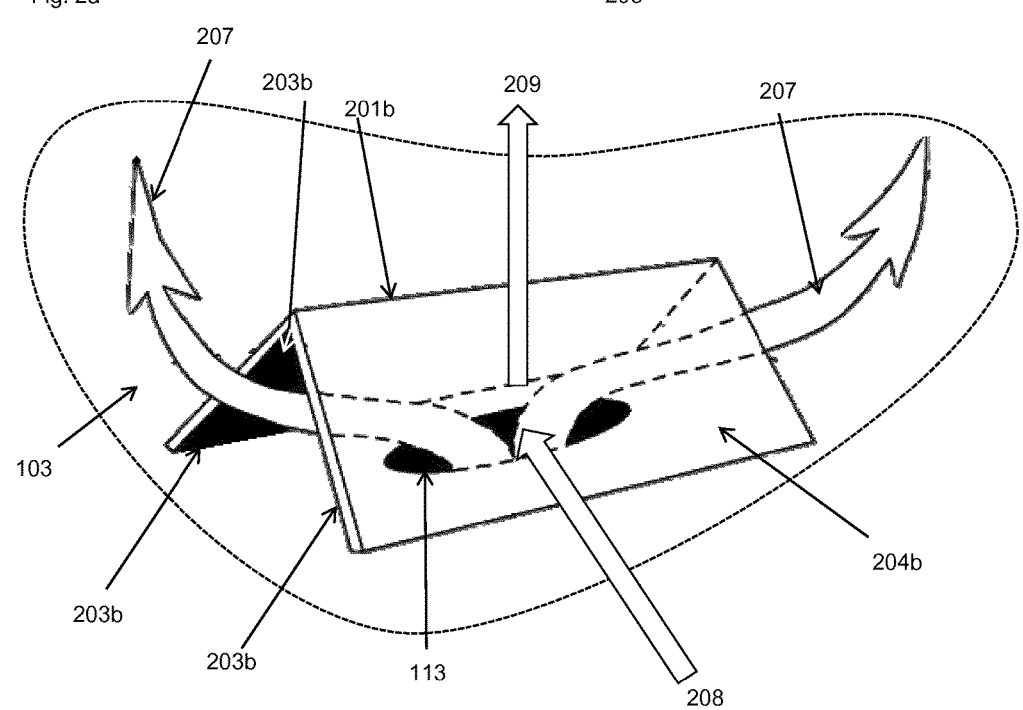
FIG. 2b shows an alternative fluid distribution cap according to the state of the art.

FIG. 2b shows a fluid distribution cap having an angle profile shape 201b according to the state of the art. The fluid distribution cap side walls 204b are flat and are connected at a substantially rectangular shaped apex. Fluid outflow 207 is performed from the fluid vent hole 113 in a similar way as the pipe segment shaped fluid distribution cap of FIG. 2a. However the inner curved surface of the pipe segment shaped fluid distribution cap 201a allows a better outflow 202. The angle profile shaped fluid distribution cap 201b may have stagnant zones near the edges at the inside of the angle profile shaped fluid distribution cap side walls 203b. The stagnant zone may cause clogging of the fluid carrying fines passing through the vent hole 113 and eventually cause plugging.

The angle profile shaped fluid distribution cap 201b has improved deflection of a horizontal component 208 of the outflow of neighboring fluid distribution caps 201b caused by the flat fluid distribution cap side wall 204b which is placed substantially at an angle of 45 degrees with respect to the fluid distribution plate 103. The deflected fluid flow 209 is substantially upward as shown in FIG. 2b.

Figure 3A:
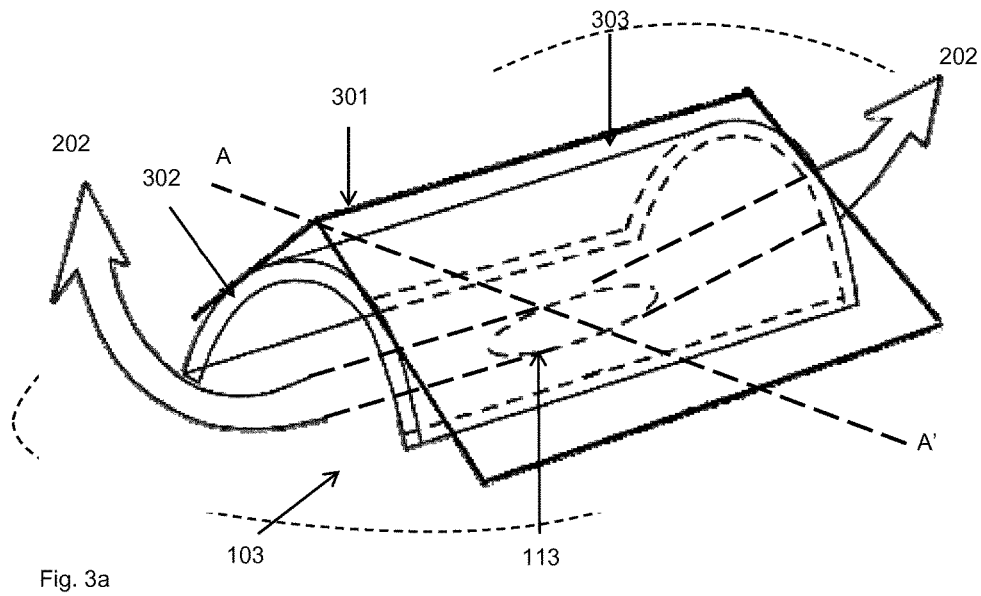
FIG. 3a shows a fluid distribution cap according to an embodiment of the invention.

FIG. 3a shows a tunnel shaped fluid distribution cap 301 having an inner surface with a curved cross section and an outer surface with a V-shaped cross section. The tunnel shaped fluid distribution cap 301 can be made from a combination of a pipe segment shaped inner element 302 as in FIG. 2a and an angled profile shaped outer element 303 as in FIG. 2b. The tunnel shaped fluid distribution cap 301 is placed over a vent hole 113 allowing fluid outflow 202 at both ends of the tunnel shaped pipe segment 302. The curved inner surface of the pipe segment shaped inner element 302 allows efficient outflow 202 of the fluid, while the V-shaped outer surface, i.e. flat sides 305a, 305b (which is referred to in FIG. 2b as 204b) of the angled profile outer element 303 allow the efficient upward deflection 209 of fluid outflows 306 from neighboring fluid distribution caps 301, as shown in FIG. 3b and similar to outflows 205 or 202 described in FIG. 2a.

Figure 3B:
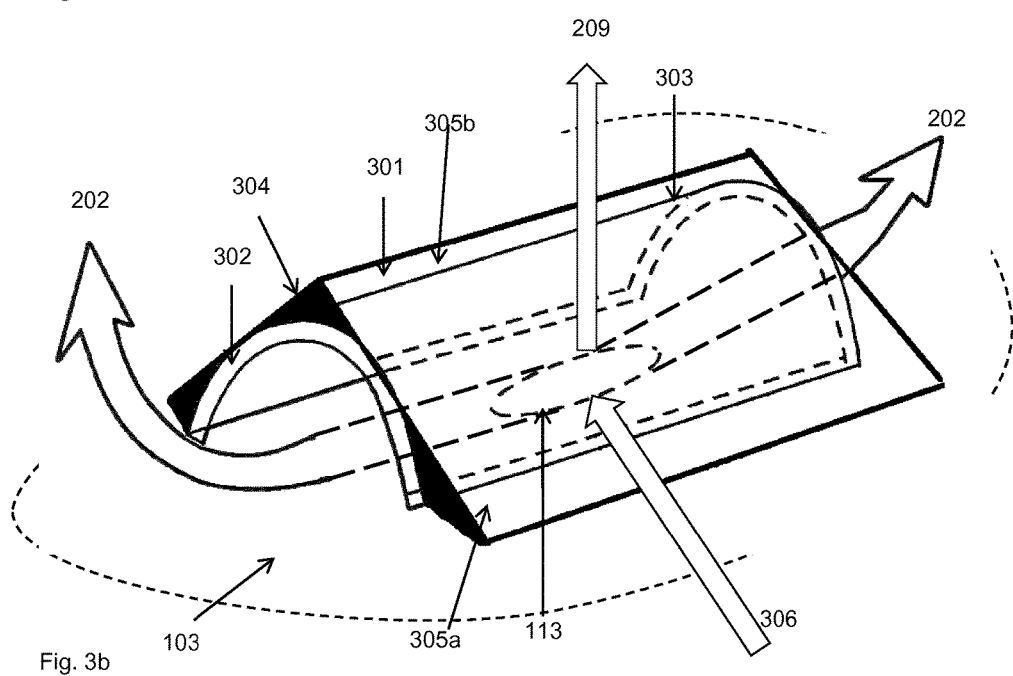
FIG. 3b shows a fluid distribution cap according to an embodiment of the invention.

Also shown in FIG. 3b, a clearance between the angle profile shaped outer element 303 and pipe segment shaped inner element 302 can be filled with a filler 304. Alternatively, the clearance 304 can be covered with an appropriate cover such that the clearance between the pipe segment 302 and the angle profile 303 is sealed off from the fluid flow across the distribution plate 1203, thereby preventing clogging and plugging of the clearance.

The pipe segment shaped inner element 302 and the angle profile shaped outer element 303 can be made from metal and be welded together to the fluid distribution plate 103. It can also be contemplated to manufacture the tunnel shaped distribution cap in a one-piece fashion, for example by casting metal in a mold or by injection molding. Other heat resistant materials may also apply. Likewise, filler materials may comprise metal, e.g. carbon steel.

Figure 4A:
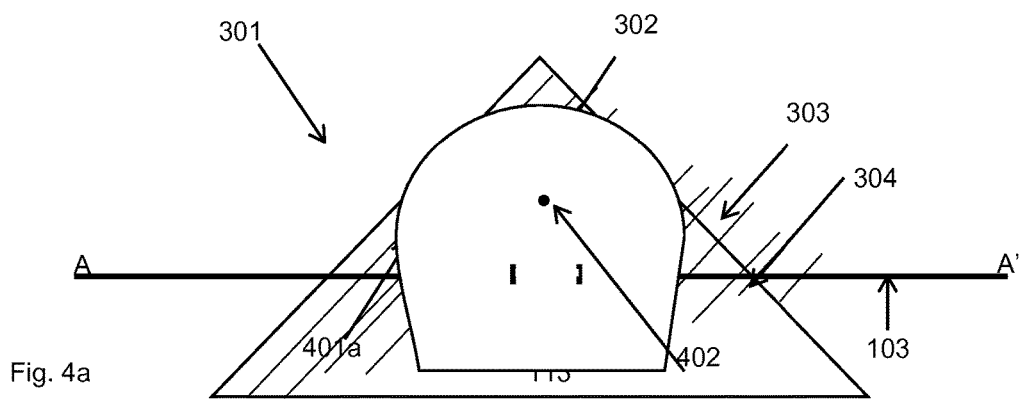
FIG. 4a shows a cross section of a fluid distribution cap according to an embodiment of the invention.

The pipe segment shape of the inner elements 302 of FIGS. 3a and 3b can be semi-circular with a central axis in the plane of the distribution plate 103 or even underneath the plane of the distribution plate 103. Alternative configurations are contemplated in FIGS. 4a and 4b, wherein the central axis of the pipe segment 302 and cross-section A-A' lies above the distribution plate 103. The position of the central axis is indicated by center point 402. FIG. 4a shows a fluid distribution cap 301 having a hoof shaped inner element 302 and an angle profile shaped outer element 303. The hatched section 304 indicates the filler or cover between the inner element 302 and the outer element 303. The hoof shaped cross section 401a of the inner element 302 need not be regular, but may have partially straight walls extending upwards from fluid distribution plate 103 and arch over to an opposite side of the vent hole 113 as shown in FIG. 4a.

Figure 4B:
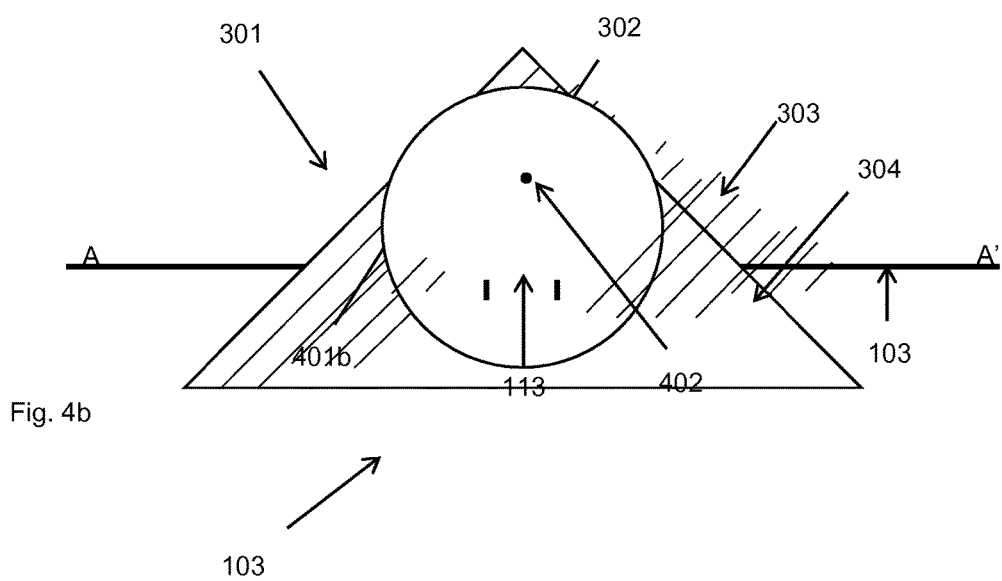
FIG. 4b shows a cross section of a fluid distribution cap according to an embodiment of the invention.

In FIG. 4b the inner element 302 is shown having a circular cross section 401b with a central axis at location 402. The edges of the cross-section of the circular inner element 302 can be aligned and connected to edges of the vent hole 113. Other variations of the inner element shape can be contemplated by the skilled person.

Figure 5:
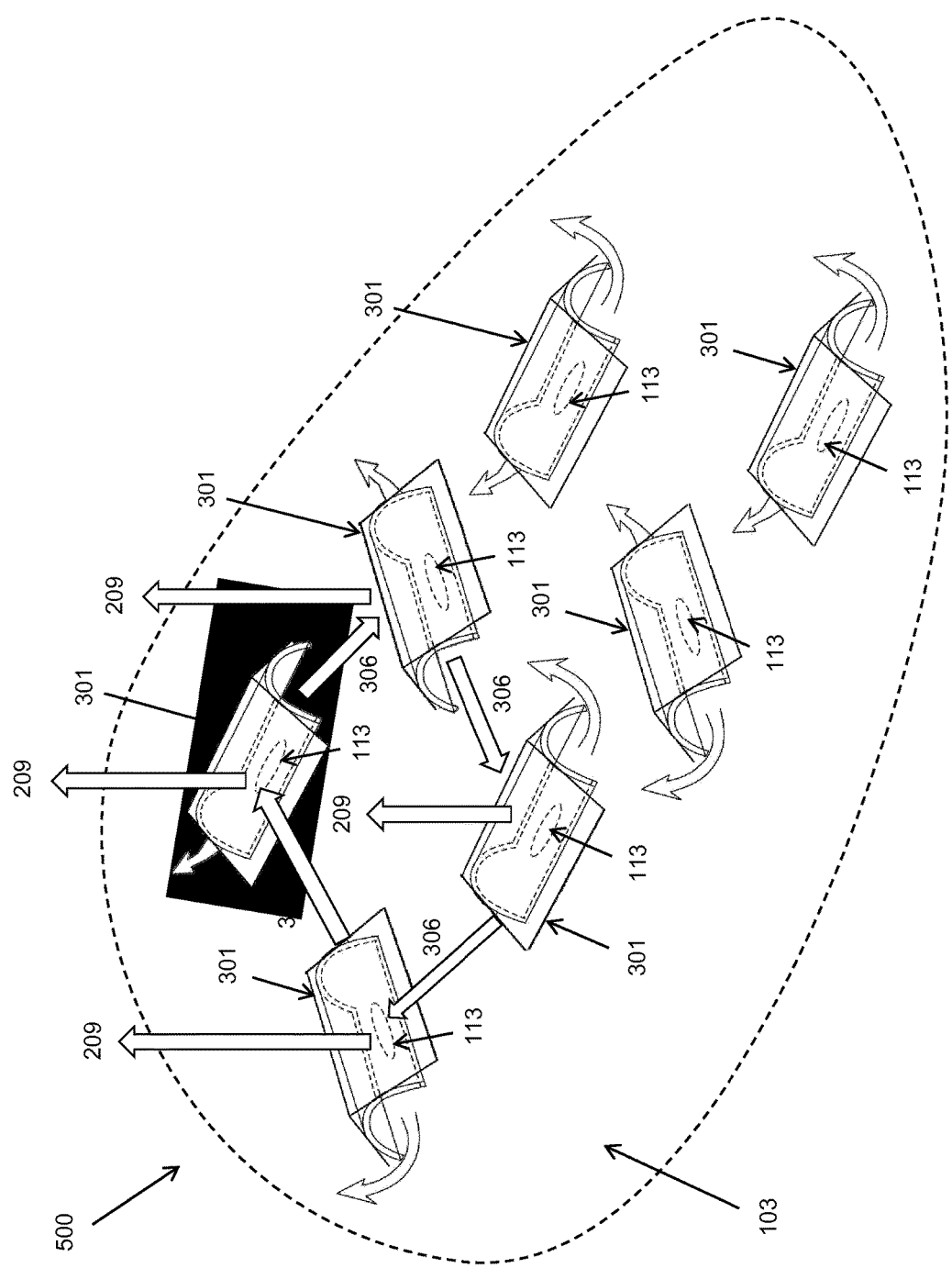
FIG. 5 shows an arrangement of fluid distribution caps according to an embodiment of the invention on a fluid distribution plate

FIG. 5 shows a fluid distribution cap arrangement 500 having a fluid distribution plate 103 with a plurality of fluid distribution caps 301 in accordance with FIGS. 3a and/or 3b. The fluid distribution caps 301 are arranged over corresponding vent holes 113 in the fluid distribution plate 103 in mutually perpendicular directions of their tunnel shaped structure. In FIG. 5 it is shown that horizontal components 306 of fluid outflows from neighboring fluid distribution caps 301 deflect upwards 209 contributing to an improved performance when applied in for example the fluidized bed reactor 101 shown in FIG. 1.

The fluid distribution caps 301 described above and shown in FIGS. 3a-5 have two openings at opposite ends of the fluid distribution cap 301 to allow fluid outflow. A skilled person may contemplate fluid distribution caps 301 having a single opening e.g. for example one opening of the fluid distribution cap 301 as described is closed. Moreover, fluid distribution caps having more than one outflow opening such as Y-shaped fluid distribution caps having three openings or X-shaped fluid distribution caps having four openings may be considered for lower pressure drop in the fluid outflow.

The above described embodiments are given by way of example only. Variations or alterations to the embodiments can be made without limiting the scope of protection as laid down in the claims as set out below.

REFERENCE NUMERALS 100 system
101 fluidized bed reactor
102 fluidized bed
103 fluid distribution plate
104 fluid distribution cap
105 fluid outlet
106 fluid inlet
107 supplementary inlet
108 product outlet
109 fluid heat exchanger
110 cycle gas compressor
111 fluid return
112 fluid supply
113 fluid vent holes
201a pipe segment cap
201b angle profile cap
202 pipe segment fluid outflow
203a stagnant zone
203b stagnant zone
204a pipe segment side wall
204b angle profile side wall
205 neighboring pipe segment outflow
206 scattered upward flow
207 angle profile fluid outflow
208 neighboring angle profile outflow
209 upward deflected fluid flow
301 tunnel shaped fluid distribution cap
302 inner element
303 outer element
304 filler or cover
305a, 305b flat side wall
306 neighboring tunnel shaped fluid distribution cap outflow
401a hoof cross section
401b circular cross section
402 central axis location
500 fluid distribution cap arrangement

The invention claimed is:

1. A fluid distribution cap for a fluidized bed reactor or a fluidized bed reactor used in a polymerization process, comprising
a tunnel shaped structure having two opposing walls for attaching to a fluid distribution plate; and
at least one opening at an end of the tunnel shaped structure, wherein the tunnel shaped structure has two openings at opposing ends of the structure;
the tunnel shaped structure having an inner surface and an outer surface, wherein the inner surface has a curved cross section, and wherein the outer surface has a substantially V-shaped cross section.

2. The fluid distribution cap according to claim 1, wherein the inner surface has a substantially semicircular cross section.

3. The fluid distribution cap according to claim 1, wherein the tunnel shaped structure is a one-piece object.

4. The fluid distribution cap according to claim 1, wherein the structure comprises an angle profile forming the V-shaped outer surface and a pipe segment forming the curved inner surface, the pipe segment attached to an inner part of the angle profile.

5. The fluid distribution cap according to claim 4, wherein the pipe segment is substantially a half pipe.

6. The fluid distribution cap according to claim 4, having a filler at each end of the structure for closing a clearance between the angle profile and the pipe segment.

7. A fluid distribution plate for a fluidized bed reactor or a fluidized bed reactor used in a polymerization process, comprising
a plate having a plurality of fluid vent holes;
a plurality of fluid distribution caps in accordance with claim 1; wherein
for each fluid vent hole a fluid distribution cap is mounted over said hole; wherein
at least two mutually neighboring fluid distribution caps are positioned with an opening of a first of the two neighboring fluid distribution caps facing a side of the second of the two neighboring fluid distribution caps.

8. A fluidized bed reactor having a fluid distribution cap comprising a tunnel shaped structure having two opposing walls for attaching to a fluid distribution plate; and at least one opening at an end of the tunnel shaped structure, wherein the tunnel shaped structure has two openings at opposing ends of the structure;

the tunnel shaped structure having an inner surface and an outer surface, wherein the inner surface has a curved cross section, and wherein the outer surface has a substantially V-shaped cross section; or having a fluid distribution plate comprising a plate having a plurality of fluid vent holes;

a plurality of the fluid distribution caps, wherein for each fluid vent hole a fluid distribution cap is mounted over said hole; wherein at least two mutually neighboring fluid distribution caps are positioned with an opening of a first of the two neighboring fluid distribution caps facing a side of the second of the two neighboring fluid distribution caps.

9. A polymerization process, comprising performing the process of polymerization with a fluid distribution cap comprising a tunnel shaped structure having two opposing walls for attaching to a fluid distribution plate; and at least one opening at an end of the tunnel shaped structure, wherein the tunnel shaped structure has two openings at opposing ends of the structure;

the tunnel shaped structure having an inner surface and an outer surface, wherein the inner surface has a curved cross section, and wherein the outer surface has a substantially V-shaped cross section; or performing the process of polymerization with a fluid distribution plate comprising a plate having a plurality of fluid vent holes; a plurality of the fluid distribution caps, wherein, for each fluid vent hole a fluid distribution cap is mounted over said hole; wherein, at least two mutually neighboring fluid distribution caps are positioned with an opening of a first of the two neighboring fluid distribution caps facing a side of the second of the two neighboring fluid distribution caps.

* * * * *